(12) United States Patent
Hayakawa et al.

(10) Patent No.: US 12,162,805 B2
(45) Date of Patent: Dec. 10, 2024

(54) POROUS HONEYCOMB STRUCTURE AND METHOD FOR MANUFACTURING SAME

(71) Applicant: NGK INSULATORS, LTD., Nagoya (JP)

(72) Inventors: Taira Hayakawa, Komaki (JP); Suguru Kodama, Nagoya (JP); Hiroaki Noguchi, Sagamihara (JP)

(73) Assignee: NGK INSULATORS, LTD., Nagoya (JP)

( * ) Notice: Subject to any disclaimer, the term of this patent is extended or adjusted under 35 U.S.C. 154(b) by 479 days.

(21) Appl. No.: 17/652,138

(22) Filed: Feb. 23, 2022

(65) Prior Publication Data
US 2022/0315496 A1 Oct. 6, 2022

(30) Foreign Application Priority Data
Mar. 30, 2021 (JP) .................................. 2021-058727

(51) Int. Cl.
*C04B 38/00* (2006.01)
*B01D 46/00* (2022.01)
(Continued)

(52) U.S. Cl.
CPC ...... *C04B 38/0009* (2013.01); *B01D 46/0001* (2013.01); *B01D 46/2448* (2013.01);
(Continued)

(58) Field of Classification Search
None
See application file for complete search history.

(56) References Cited

U.S. PATENT DOCUMENTS

| 2008/0092499 A1 | 4/2008 | Otsuka et al. |
| 2012/0317947 A1 | 12/2012 | Okazaki |

(Continued)

FOREIGN PATENT DOCUMENTS

| CN | 102762273 A | 10/2012 |
| JP | 4954705 B2 | 6/2012 |

(Continued)

OTHER PUBLICATIONS

Chinese Office Action dated Jul. 5, 2023 (Application No. 202210174356.1).

*Primary Examiner* — Elizabeth Collister
(74) *Attorney, Agent, or Firm* — BURR PATENT LAW, PLLC (57) ABSTRACT

A porous honeycomb structure including cell channels passing through an interior of the porous honeycomb structure and partitioned by porous partition walls, wherein the porous partition walls include skeleton portions containing an aggregate and a bonding material, and pore portions formed among the skeleton portions and through which a fluid can flow; and the porous partition walls have a porosity of 40 to 48% as measured by a mercury intrusion method, and a cumulative 50% pore diameter (D50) from a large pore side of 6 to 10 μm in a volume-based cumulative distribution of pore diameters measured by the mercury intrusion method, and a maximum pore diameter observed with a scanning electron microscope of 40 μm or less, and a ratio of a contact area between the aggregate and the bonding material to a surface area of the bonding material observed with the scanning electron microscope of 61 to 80%.

4 Claims, 3 Drawing Sheets

(51) Int. Cl.
*B01D 46/24* (2006.01)
*B01D 53/94* (2006.01)
*B01J 35/56* (2024.01)
*C04B 38/06* (2006.01)

(52) U.S. Cl.
CPC . *B01D 46/24491* (2021.08); *B01D 46/24492* (2021.08); *B01D 46/24494* (2021.08); *B01D 53/94* (2013.01); *B01J 35/56* (2024.01); *C04B 38/0054* (2013.01); *C04B 38/0645* (2013.01); *B01D 46/249* (2021.08); *B01D 2279/30* (2013.01)

(56) References Cited

U.S. PATENT DOCUMENTS

2013/0059724 A1* 3/2013 Hirose ............... B01D 46/2429
428/116
2019/0300445 A1 10/2019 Noguchi et al.

FOREIGN PATENT DOCUMENTS

| JP | 2018-197182 A | 12/2018 |
| JP | 2019-178044 A | 10/2019 |

* cited by examiner

POROUS HONEYCOMB STRUCTURE AND METHOD FOR MANUFACTURING SAME

CROSS REFERENCE TO RELATED APPLICATIONS

The present invention claims the benefit of priority to Japanese Patent Application No. 2021-058727 filed on Mar. 30, 2021 with the Japanese Patent Office, the entire contents of which are incorporated herein by reference in its entirety.

FIELD OF THE INVENTION

The present invention relates to a porous honeycomb structure and a method for manufacturing the same.

BACKGROUND OF THE INVENTION

Exhaust gas emitted from internal combustion engines such as diesel engines and gasoline engines and various combustion devices contains a large amount of particulate matter (hereinafter, also referred to as "PM") such as soot. If PM is released into the atmosphere as it is, it causes environmental pollution. Therefore, an exhaust gas exhaust system is equipped with a dust collecting filter (hereinafter, also referred to as "particulate filter") for collecting PM. For example, examples of the dust collecting filter used for purifying the exhaust gas emitted from a diesel engine and a gasoline engine include a diesel particulate filter (DPF) and a gasoline particulate filter (GPF). As the DPF and GPF, a porous honeycomb structure having a plurality of cell channels partitioned by porous partition walls has been conventionally used.

Generally, the collection efficiency and pressure loss of the dust collecting filter using a porous honeycomb structure are inversely proportional to each other. If an attempt is made to increase the collection efficiency, the pressure loss increases, whereas if an attempt is made to decrease the pressure loss, the collection efficiency deteriorates. Therefore, in order to obtain high collection efficiency with low pressure loss, various researches and developments have been carried out on the structure of the porous partition walls of the dust collection filter.

For example, Patent Literature 1 (Japanese Patent No. 4954705) discloses a porous honeycomb filter with a controlled pore distribution, which is manufactured from a filter raw material obtained by adding a pore-forming material having an average particle diameter of 5 to 50 μm and 10% by mass or less of particles having a particle diameter of 100 μm or more to a raw material of non-oxide ceramics, wherein a pore volume (absolute value) per unit volume obtained by multiplying a pore volume (cc/g) obtained by pore characteristic measurement for a pore diameter of 15 μm or less by a material density (g/cc) is 0.07 cc/cc or less, and a pore volume (absolute value) per unit volume obtained by multiplying a pore volume (cc/g) obtained by the pore characteristic measurement for a pore diameter of 40 μm or more by the material density (g/cc) is 0.07 cc/cc or less.

Further, although a predetermined strength is required for the dust collecting filter, the strength of the dust collecting filter tends to decrease when trying to reduce the pressure loss. Accordingly, Patent Literature 2 (Japanese Patent Application Publication No. 2019-178044) discloses a porous ceramic body, comprising skeleton portions comprising an aggregate and a bonding material, and pore portions formed among the skeleton portions and through which a fluid can flow, wherein in the pore portions, a pore volume ratio of pores having a pore diameter of 1 to 10 μm is 45% or more, and a ratio of a contact area between the aggregate and the bonding material to a surface area of the bonding material is 20 to 60%. Patent Literature 2 disclosed that this porous ceramic body has high strength and can suppress an increase in pressure loss.

PRIOR ART

Patent Literature

[Patent Literature 1] Japanese Patent No. 4954705
[Patent Literature 2] Japanese Patent Application Publication No. 2019-178044

SUMMARY OF THE INVENTION

As described above, various improvements have been made to the dust collection filter using the porous honeycomb structure, but from a viewpoint of simultaneously overcoming three problems of high strength, high collection efficiency and low pressure loss, there is still room for improvement. The present invention has been made to solve the above problems, and in one embodiment, an object of the present invention is to provide a porous honeycomb structure capable of achieving high strength and high collection efficiency even though the pressure loss when flowing a gas containing PM is low. Further, another object of the present invention is to provide a method for manufacturing such a porous honeycomb structure.

As a result of diligent studies on the above problems, the present inventors have obtained the following findings.

Patent Literature 1 discloses that it is desirable to reduce the pore volume having a pore diameter of 40 μm or more in order to improve the collection efficiency. However, even if the number of pores having a pore diameter of 40 μm or more is small, the collection performance is significantly reduced.

Patent Literature 1 discloses that it is preferable that the pore volume having a pore diameter of 15 μm or less be small, but since pores having a pore diameter of 10 μm or less are very effective for PM collection, it is preferable that they rather exist positively.

In Patent Literature 2, the ratio of the contact area between the aggregate and the bonding material to the surface area of the bonding material is controlled to 60% or less. Patent Literature 2 discloses that such configuration improves the communication among pores. However, although reducing the ratio of the contact area contributes to the low pressure loss, there is room for improvement in increasing the strength. Increasing the mass ratio of the bonding material improves the strength, but small pores are crushed and the PM collection performance is lowered. Therefore, in order to maintain the small pores that contribute to the PM collection performance, it is preferable to suppress the increase in pressure loss by measures other than reducing the contact area.

Based on the above findings, the present inventors have further studied and created the present invention exemplified as below.

[1] A porous honeycomb structure, comprising a plurality of cell channels that passes through an interior of the porous honeycomb structure and is partitioned by porous partition walls, wherein the porous partition walls comprise skeleton portions comprising an aggregate and a bonding material, and pore portions formed among the skeleton portions and through which a fluid can flow; and the porous partition walls have a porosity of 40 to 48% as measured by a mercury intrusion method, and a cumulative 50% pore diameter (D50) from a large pore side of 6 to 10 μm in a volume-based cumulative distribution of pore diameters measured by the mercury intrusion method, and a maximum pore diameter observed with a scanning electron microscope of 40 μm or less, and a ratio of a contact area between the aggregate and the bonding material to a surface area of the bonding material observed with the scanning electron microscope of 61 to 80%.

[2] The porous honeycomb structure according to [1], wherein the porous partition walls have a volume ratio of pores having a pore diameter of 7 to 9 μm with respect to a total pore volume of 40 to 60% in a volume-based frequency distribution of pore diameters measured by the mercury intrusion method.

[3] The porous honeycomb structure according to [1] or [2], wherein a thermal conductivity at 50° C. measured by a steady-state thermal conductivity meter in accordance with ASTM E1530 is 11 W/(m·K) or more.

[4] A method for manufacturing the porous honeycomb structure according to any one of [1] to [3], comprising:

a step of obtaining a honeycomb formed body obtained by forming a green body comprising an aggregate, a bonding material, an organic pore-forming material, a binder and a dispersion medium, the honeycomb formed body comprising a plurality of cell channels that passes through an interior of the porous honeycomb structure and is partitioned by porous partition walls; and a step of firing the honeycomb formed body;

wherein the organic pore-forming material is comprised in the honeycomb formed body in an amount of 5 to 13 parts by mass with respect to a total of 100 parts by mass of the aggregate and the bonding material, and the organic pore-forming material has a cumulative 50% particle diameter (D50) from a small particle side in a range of 4 to 12 μm, and a proportion of particles having a particle diameter of 20 μm or more of 5% by volume or less in a volume-based cumulative distribution of particle diameters measured by a laser diffraction/scattering method; and the aggregate is comprised in the honeycomb formed body in an amount of 75 to 85 parts by mass with respect to the total of 100 parts by mass of the aggregate and the bonding material, and the aggregate has a cumulative 50% particle diameter (D50) from a small particle side of in a range of 15 to 24 μm, and a proportion of particles having a particle diameter of 30 μm or more of 20% by volume or less in a volume-based cumulative distribution of particle diameters measured by the laser diffraction/scattering method.

According to one embodiment of the present invention, there is provided a porous honeycomb structure capable of achieving high strength and high collection efficiency even though the pressure loss when flowing a gas containing PM is low. Such porous honeycomb structure can be suitably used as a dust collecting filter for recent DPFs and GPFs, which are required to have high performance.

DETAILED DESCRIPTION OF THE INVENTION

Hereinafter, embodiments of the present invention will now be described in detail with reference to the drawings. It should be understood that the present invention is not intended to be limited to the following embodiments, and any change, improvement or the like of the design may be appropriately added based on ordinary knowledge of those skilled in the art without departing from the spirit of the present invention. A plurality of elements disclosed in each embodiment can form various inventions by appropriate combinations. For example, some elements may be removed from the entire elements shown in one embodiment, or elements of different embodiments may be combined as appropriate.

1. Porous Honeycomb Structure

A porous honeycomb structure according to an embodiment of the present invention will be described. The porous honeycomb structure according to the present embodiment can be used as a dust collection filter such as a DPF (Diesel Particulate Filter) and a GPF (Gasoline Particulate Filter) that collects soot mounted on an exhaust gas line from a combustion device, which is typically an engine mounted on a vehicle. The honeycomb structure according to this embodiment can be installed in an exhaust pipe, for example.

The porous honeycomb structure according to one embodiment of the present invention comprises a plurality of cell channels that passes through the interior of the porous honeycomb structure and is partitioned by porous partition walls. The porous partition walls comprise skeleton portions comprising an aggregate and a bonding material, and pore portions formed among the skeleton portions and through which a fluid can flow. In order to achieve high strength and high collection efficiency while achieving low pressure loss when a gas containing PM is flowed, it is essential to appropriately control the porosity, cumulative 50% pore diameter (D50), maximum pore diameter, and ratio of the contact area between the aggregate and the bonding material to the surface area of the bonding material in the porous partition walls. Hereinafter, these suitable conditions will be described.

1-1. Porosity

Regarding the porous partition walls, from the viewpoint of suppressing the increase in pressure loss, the lower limit of the porosity measured by a mercury intrusion method is preferably 40% or more, more preferably 41% or more, even more preferably 42% or more, and most preferably 43% or more. In addition, regarding the porous partition walls, from the viewpoint of ensuring the strength, the upper limit of the porosity measured by the mercury intrusion method is preferably 48% or less, more preferably 47% or less, even more preferably 46% or less, and most preferably 45% or less. Therefore, the porous partition walls preferably have a porosity of, for example, 40 to 48%, more preferably 41 to 47%, and even more preferably 42 to 46%, as measured by the mercury intrusion method. In the present specification, "porosity" is measured by the mercury intrusion method specified in JIS 81655: 2003. Further, the porosity is measured by taking an average value when samples of the porous partition walls are collected from a plurality of locations of the porous honeycomb structure and measured.

1-2. Cumulative 50% Pore Diameter (D50)

Regarding the porous partition walls, from the viewpoint of suppressing the increase in pressure loss, in a volume-based cumulative distribution of pore diameters measured by the mercury intrusion method, the lower limit of the cumulative 50% pore diameter (D50) from the large pore side is preferably 6 µm or more, more preferably 6.5 µm or more, and even more preferably 7 µm or more. In addition, regarding the porous partition walls, in the volume-based cumulative distribution of pore diameters measured by the mercury intrusion method, the upper limit of the cumulative 50% pore diameter (D50) from the large pore side is preferably 10 µm or less, more preferably 9.5 µm or less, and even more preferably 9 µm or less. Therefore, regarding the porous partition walls, in the volume-based cumulative distribution of pore diameters measured by the mercury intrusion method, the cumulative 50% pore diameter (D50) from the large pore side is preferably, for example, 6 to 10 µm, more preferably 7.5 to 9.5 µm, and even more preferably 7 to 9 µm. In the present specification, the "cumulative 50% pore diameter (D50) from the large pore side" is obtained from the volume-based cumulative distribution of pore diameters measured by the mercury intrusion method specified in JIS R1655: 2003. Further, the "cumulative 50% pore diameter (D50) from the large pore side" is measured by taking an average value when samples of the porous partition walls are collected from a plurality of locations of the porous honeycomb structure and measured.

1-3. Maximum Pore Diameter

Regarding the porous partition walls, from the viewpoint of increasing the collection efficiency, the upper limit of the maximum pore diameter observed by a scanning electron microscope is preferably 40 µm or less, more preferably 35 µm or less, and even more preferably 30 µm or less. In the porous partition walls, the lower limit of the maximum pore diameter observed by the scanning electron microscope (SEM) is not particularly limited. This is because if the cumulative 50% pore diameter (D50) described above is within an appropriate range, the maximum pore diameter will naturally settle to an appropriate value. For example, the lower limit of the maximum pore diameter observed with a scanning electron microscope is typically 15 µm or more, and more typically 20 µm or more. Therefore, the porous partition walls preferably have a maximum pore diameter of, for example, 15 to 40 µm, more preferably 20 to 35 µm, as observed by the scanning electron microscope.

Figure 3:
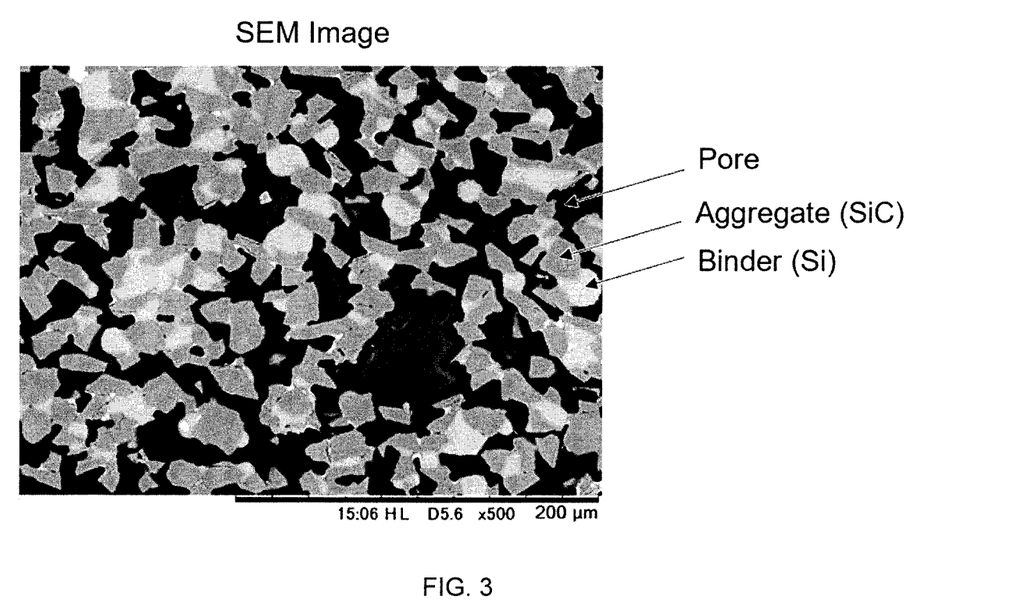
FIG. 3 shows an example of an SEM image used for measuring the maximum pore diameter and the ratio of the contact area between the aggregate and the bonding material to the surface area of the bonding material.

In the present specification, the maximum pore diameter of the porous partition walls is measured by the following procedure.
- a) From the porous honeycomb structure, a test piece of a porous partition wall having a cut surface in a direction orthogonal to the direction in which the cell channels extend is cut out.
- b) The test piece is embedded in a resin such that the cut surface is exposed, and then the cut surface is subjected to surface-polishing using an automatic polishing machine (total load type). As the abrasive, a diamond slurry having a particle diameter of 9 µm, a diamond slurry having a particle diameter of 3 µm, a diamond slurry having a particle diameter of 1 µm, and colloidal silica having a particle diameter of 0.08 µm are used in this order. The particle diameter of the abrasive is a volume-based cumulative 50% particle diameter (D50) measured by ISO 13320: 2020 (particle diameter analysis-laser diffraction method). The obtained polished surface is observed using a scanning electron microscope (SEM) (magnification: 500 times, size of a field of view: 240 µm×300 µm) (see FIG. 3).
- c) In the SEM image of the cut surface, the largest inscribed circle that can be encompassed in the pore portion is drawn and its diameter is measured. The diameter is defined as the maximum pore diameter in the test piece. Then, the maximum pore diameter of the entire porous partition walls is measured by taking an average value when test pieces of the porous partition wall are collected from three or more locations of the porous honeycomb structure and measured.

The maximum pore diameter is not measured based on the pore diameter distribution obtained by the mercury intrusion method, but is measured based on the SEM image for the following reasons. In the mercury intrusion method, the region having a pore diameter of about 40 µm or more corresponds to a shallow and wide dent on the surface due to the nature of this measurement, but the maximum pore diameter which is important in the present invention is the pore inside the porous partition wall. Therefore, the measurement is performed based on the SEM image.

1-4. Ratio of Contact Area Between Aggregate and Bonding Material to Surface Area of Bonding Material Regarding the porous partition walls, from the viewpoint of ensuring strength, the lower limit of the ratio of the contact area between the aggregate and the bonding material to the surface area of the bonding material observed by the scanning electron microscope is preferably 61% or more, more preferably 63% or more, even more preferably 65% or more, and even more preferably 68% or more. The high ratio of the contact area also has the effect of increasing the thermal conductivity. Due to the high thermal conductivity of the porous honeycomb structure, it is possible to improve the removal performance when the PM collected in the porous honeycomb structure is burned and removed for filter regeneration. In addition, regarding the porous partition walls, from the viewpoint of suppressing an increase in pressure loss, the upper limit of the ratio of the contact area between the aggregate and the bonding material to the surface area of the bonding material observed by the scanning electron microscope is preferably 80% or less, more preferably 77% or less, more preferably 75% or less, and even more preferably 72% or less. Therefore, regarding the porous partition walls, the ratio of the contact area between the aggregate and the bonding material to the surface area of the bonding material observed by the scanning electron microscope is, for example, preferably 61 to 80%, more preferably 63 to 77%, even more preferably 65 to 75%, and even more preferably 68 to 72%.

In the present specification, the contact area in the porous partition wall is measured by the following procedure.

a) From the porous honeycomb structure, a test piece of a porous partition wall having a cut surface in a direction orthogonal to the direction in which the cell channels extend is cut out.

b) The test piece is embedded in a resin such that the cut surface is exposed, and then the cut surface is subjected to surface-polishing using an automatic polishing machine (total load type). As the abrasive, a diamond slurry having a particle diameter of 9 µm, a diamond slurry having a particle diameter of 3 µm, a diamond slurry having a particle diameter of 1 µm, and colloidal silica having a particle diameter of 0.08 µm are used in this order. The particle diameter of the abrasive is a volume-based cumulative 50% particle diameter (D50) measured by ISO 13320: 2020 (particle diameter analysis-laser diffraction method). The obtained polished surface is observed using a scanning electron microscope (SEM) (magnification: 500 times, size of a field of view: 240 µm×300 µm) (see FIG. 3).

c) Image analysis of the SEM image obtained by SEM observation is performed. In the image analysis, based on the obtained SEM image, the length of the curve of the contact portion between the aggregate and the bonding material and the length of the curve of the outer edge of the bonding material are measured, respectively. The length of the curve of the contact portion between the aggregate and the bonding material is presumed as the "contact area between the aggregate and the bonding material", and the length of the curve of the outer edge of the bonding material is presumed as the "surface area of the bonding material". Voids, the aggregate and the bonding material are identifiable because of their difference in brightness on the SEM image. After the voids are excluded, by binarizing the aggregate and the bonding material and extracting the boundary line (the contact portion) between the two, the length of the curve of the contact portion between the aggregate and the bonding material and the length of the curve of the outer edge of the bonding material can be measured. Elemental analysis may be performed by XPS or the like, if necessary. Then, the ratio of the contact area in the test piece is calculated by "the length of the curve of the contact portion between the aggregate and the bonding material (=the contact area between the aggregate and the bonding material)/the length of the curve of the outer edge of the bonding material (=the surface area of the bonding material)× 100(%)". Then, the ratio of the contact area of the entire porous partition walls is measured by taking an average value when test pieces of the porous partition wall are collected from three or more locations of the porous honeycomb structure and measured.

For the porosity, the cumulative 50% pore diameter (D50), the maximum pore diameter, and the ratio of the contact area between the aggregate and the bonding material to the surface area of the bonding material, it is preferable that all of these are combined in the above-mentioned suitable range in order to achieve high strength and high collection efficiency while achieving low pressure loss when a gas containing PM is flowed.

Therefore, in one preferred embodiment, the porous partition walls have a porosity of 40 to 48% as measured by the mercury intrusion method, and the cumulative 50% pore diameter (D50) from the large pore side of 6 to 10 µm in the volume-based cumulative distribution of pore diameters measured by the mercury intrusion method, and the maximum pore diameter observed with the scanning electron microscope of 40 µm or less, and the ratio of the contact area between the aggregate and the bonding material to the surface area of the bonding material observed with the scanning electron microscope of 61 to 80%.

In a more preferred embodiment, the porous partition walls have a porosity of 41 to 47% as measured by the mercury intrusion method, and the cumulative 50% pore diameter (D50) from the large pore side of 6.5 to 9.5 µm in the volume-based cumulative distribution of pore diameters measured by the mercury intrusion method, and the maximum pore diameter observed with the scanning electron microscope of 35 µm or less, and the ratio of the contact area between the aggregate and the bonding material to the surface area of the bonding material observed with the scanning electron microscope of 63 to 77%.

In an even more preferred embodiment, the porous partition walls have a porosity of 42 to 46% as measured by the mercury intrusion method, and the cumulative 50% pore diameter (D50) from the large pore side of 7 to 9 µm in the volume-based cumulative distribution of pore diameters measured by the mercury intrusion method, and the maximum pore diameter observed with the scanning electron microscope of 30 µm or less, and the ratio of the contact area between the aggregate and the bonding material to the surface area of the bonding material observed with the scanning electron microscope of 65 to 75%.

The aggregate used for the skeleton portion is not particularly limited, and those known in the art can be used. Among them, the aggregate is preferably silicon carbide, silicon nitride, aluminum nitride, mullite, titanium oxide or composite oxides containing titanium oxide (for example, aluminum titanate). Using such a material as an aggregate is advantageous for obtaining a porous honeycomb structure having excellent strength and thermal shock resistance.

The bonding material used for the skeleton portion is not particularly limited, and those known in the art can be used. Among them, the bonding material is preferably at least one selected from metallic silicon, silicon carbide, aluminum oxide and a composite oxide containing the same (for example, cordierite).

[1-5. Volume Ratio of Pores with Pore Diameter of 7 to 9 µm]

In addition to the porosity, the cumulative 50% pore diameter (D50), the maximum pore diameter, and the ratio of the contact area between the aggregate and the bonding material to the surface area of the bonding material, it is preferable to control the volume ratio of the pores having a pore diameter of 7 to 9 µm with respect to the total pore volume in a volume-based frequency distribution of pore diameters of the porous partition walls measured by the mercury intrusion method within a predetermined range. Specifically, in the porous partition walls, from the viewpoint of improving the collection efficiency, it is preferable that the lower limit of the volume ratio of the pores having a pore diameter of 7 to 9 µm with respect to the total pore volume in the volume-based frequency distribution of pore diameters measured by the mercury intrusion method is 40% or more, more preferably 45% or more, and even more preferably 50% or more. In addition, in the porous partition walls, from the viewpoint of suppressing the increase in pressure loss, the upper limit of the volume ratio of pores having a pore diameter of 7 to 9 µm with respect to the total pore volume in the volume-based frequency distribution of pore diameters measured by the mercury intrusion method is 60% or less, and more preferably 55% or less.

Accordingly, in the porous partition walls, the volume ratio of pores having a pore diameter of 7 to 9 μm with respect to the total pore volume is preferably, for example, 40 to 60%, and more preferably 45 to 55% in the volume-based frequency distribution of pore diameters measured by the mercury intrusion method. In the present specification, the "volume ratio of pores having a pore diameter of 7 to 9 μm with respect to the total pore volume" is obtained from the volume-based frequency distribution of pore diameters measured by the mercury intrusion method specified in JIS R1655: 2003. Further, the "volume ratio of pores having a pore diameter of 7 to 9 μm with respect to the total pore volume" is measured by taking an average value when samples of the porous partition walls are collected from a plurality of locations of the porous honeycomb structure and measured.

1-6. Thermal Conductivity

As described above, in the porous partition walls of the porous honeycomb structure according to one embodiment of the present invention, the ratio of the contact area between the aggregate and the bonding material to the surface area of the bonding material is high. As a result, it becomes possible to show excellent thermal conductivity. For example, the thermal conductivity at 50° C. measured by a steady-state thermal conductivity meter in accordance with ASTM E1530 is preferably 11 W/(m·K) or more, preferably 15 W/(m·K) or more, and even more preferably 20 W/(m·K) or more. It is preferable that the thermal conductivity be high, so the upper limit is not particularly limited, but in one embodiment, it is 30 W/(m·K) or less, and typically 25 W/(m·K) or less. Further, the thermal conductivity is measured by taking an average value when samples of the porous partition walls is collected from a plurality of locations of the porous honeycomb structure and measured.

1-7. Detailed Embodiments

Figure 1A:
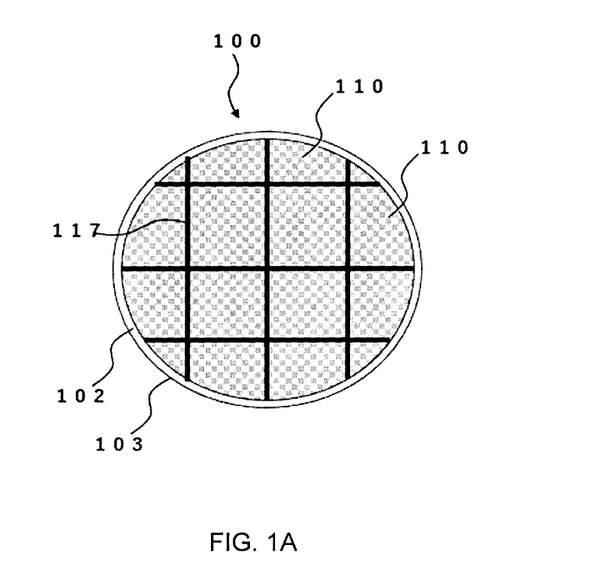
FIGS. 1A and 1B are schematic bottom and side views of a wall flow type porous honeycomb structure.
Figure 1B:
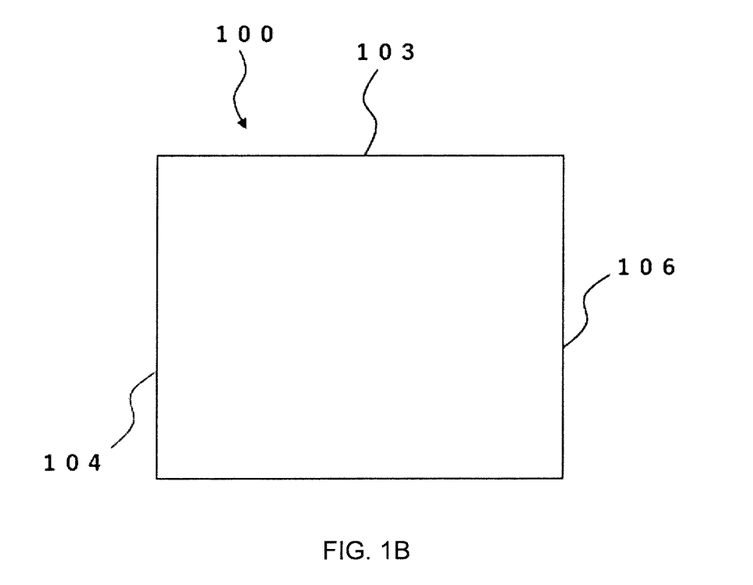
Figure 2:
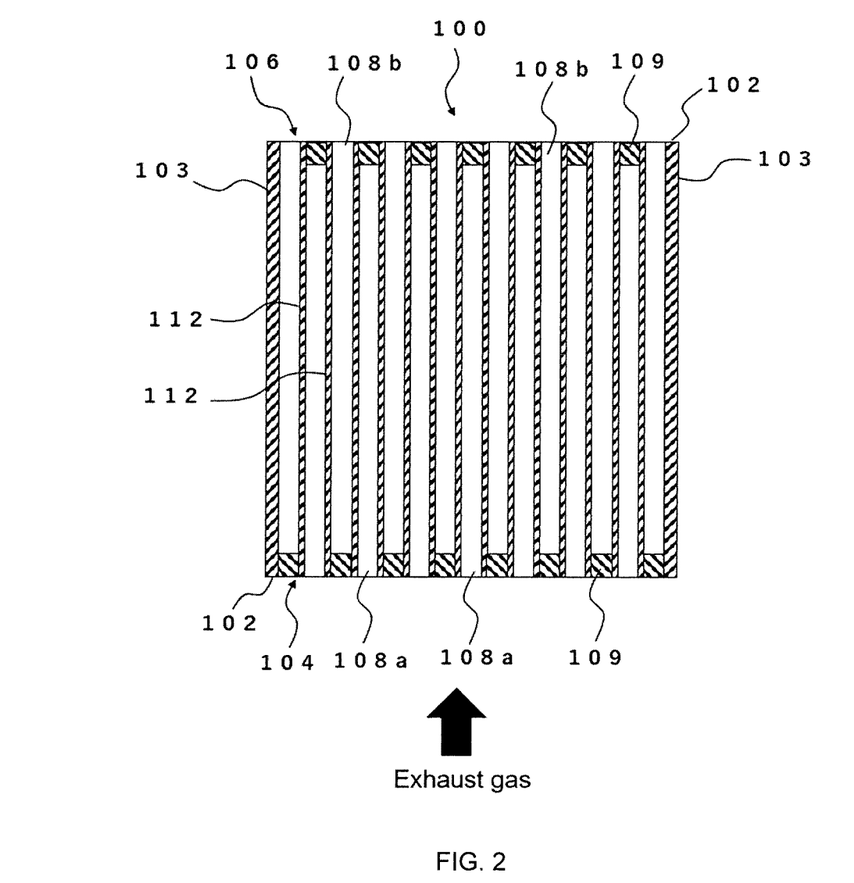
FIG. 2 is a schematic cross-sectional view when observing a cross-section of a wall flow type porous honeycomb structure parallel to the direction in which the cells extend.

FIG. 1A-FIG. 2 illustrate a schematic perspective view and a cross-sectional view of a porous honeycomb structure 100 which is applicable as a wall flow type automobile exhaust gas filter and/or catalyst carrier, respectively. The porous honeycomb structure 100 comprises an outer peripheral side wall 102, and porous partition walls 112 arranged on the inner peripheral side of the outer peripheral side wall 102, the partition walls 112 partitioning a plurality of cells 108a and 108b that form fluid flow paths (cell channels) from a first end surface 104 to a second end surface 106. The outer surface of the outer peripheral side wall 102 forms the side surface 103 of the porous honeycomb structure 100.

In the porous honeycomb structure 100, the plurality of cells 108a and 108b can be classified into a plurality of first cells 108a each extending from the first end surface 104 to the second end surface 106, opening on the first end surface 104 and having plugged portions 109 on the second end surface 106, and a plurality of second cells 108b each extending from the first end surface 104 to the second end surface 106, having plugged portions 109 on the first end surface 104 and opening on the second end surface 106. Further, in the porous honeycomb structure 100, the first cells 108a and the second cells 108b are alternately arranged adjacent to each other with the partition wall 112 interposed therebetween.

When the exhaust gas containing particulate matter such as soot is supplied to the first end surface 104 on the upstream side of the porous honeycomb structure 100, the exhaust gas is introduced into the first cells 108a and proceeds downstream in the first cells 108a. Since the first cells 108a have plugged portions 109 on the second end surface 106 on the downstream side, the exhaust gas penetrates the porous partition walls 112 that partition the first cells 108a and the second cells 108b, and flows into the second cells 108b. Since particulate matter cannot pass through the porous partition walls 112, it is collected and deposited in the first cells 108a. After the particulate matter is removed, the clean exhaust gas that has flowed into the second cells 108b proceeds downstream in the second cells 108b and flows out of the second end surface 106 on the downstream side. Here, the first end surface 104 is regarded as on the upstream side of the exhaust gas, and the second end surface 106 is regarded as on the downstream side of the exhaust gas. Note that this distinction between the first end surface and the second end surface is merely for convenience, and the second end surface 106 may be the on the upstream side of the exhaust gas and the first end surface 104 may be on the downstream side of the exhaust gas.

The shape of the end surfaces of the porous honeycomb structure filter is not limited, and it may be, for example, a round shape such as a circle, a long circle, an ellipse, an oval, and shapes consisting of multiple different arc components, or a polygon such as a triangle or a quadrangle. The round shape refers to a shape of a simple closed curve which is composed of a simple closed-convex curve having no inwardly recessed outer peripheral contour portion.

The shape of the cells in the cross-section perpendicular to the direction in which the cells extend is not limited, but is preferably a quadrangle, a hexagon, an octagon, or a combination thereof. Among these, a square and a hexagon are preferred. By making the shape of the cells in this way, the pressure loss when a fluid passed through the porous honeycomb structure is reduced, and the gas purification performance is excellent.

The area of each end surface of the porous honeycomb structure is not particularly limited, but can be, for example, 6200 to 93000 $mm^2$, and typically 16200 to 73000 $mm^2$.

The height of the porous honeycomb structure (the length from the first end surface to the second end surface) is not particularly limited and may be appropriately set according to the application and required performance. The height of the porous honeycomb structure can be, for example, 100 mm to 330 mm. There is no particular limitation on the relationship between the height of the porous honeycomb structure and the maximum diameter of each end surface (referring to the maximum length of the diameters passing through the center of gravity of each end surface of the porous honeycomb structure). Therefore, the height of the porous honeycomb structure may be longer than the maximum diameter of each end surface, or the height of the porous honeycomb structure may be shorter than the maximum diameter of each end surface.

The cell density (number of cells per unit cross-sectional area) is not particularly limited, but may be, for example, 6 to 2000 cells/square inch (0.9 to 311 cells/$cm^2$), more preferably 50 to 1000 cells/square inch (7.8 to 155 cells/$cm^2$), particularly preferably 100 to 600 cells/square inch (15.5 to 62.0 cells/$cm^2$). Here, the cell density is calculated by dividing the number of cells on one end surface (including the plugged cells) by the area of the end surface excluding the outer peripheral side wall.

The thickness of the porous partition wall is also not particularly limited, but is preferably 150 μm to 310 μm, for example. From the viewpoint of enhancing the strength and gas purification performance of the porous honeycomb structure, the lower limit of the thickness of the partition wall is preferably 150 µm or more, and more preferably 170 µm or more. Further, from the viewpoint of suppressing an increase in pressure loss, the upper limit of the thickness of the partition wall is preferably 310 µm or less, and more preferably 260 µm or less. In the present specification, the thickness of the partition wall refers to a crossing length of a line segment that crosses the partition wall when the centers of gravity of adjacent cells are connected by this line segment in a cross section orthogonal to the direction in which the cells extend.

The porous honeycomb structure can be provided as an integrally formed body. Further, as shown in FIG. 1A-FIG. 2, the porous honeycomb structure 100 can also be provided as a segment joint body by joining and integrating a plurality of porous honeycomb structure segments 110, each having an outer peripheral side wall, with each other on the side surfaces via a joining material 117. By providing the porous honeycomb structure as a segment joint body, the thermal shock resistance can be enhanced.

The segment joint body can be manufactured, for example, by the following procedure. With a joining material adhesion prevention film attached to both end surfaces of each pillar-shaped honeycomb structure segment, a joining material is applied to the bonding surfaces (side surfaces). Next, these segments are arranged adjacent to each other so that the side surfaces of the segments face each other, and the adjacent segments are joined to each other with pressure. After the pressure joining, the undried joining material protruding from at least one surface of the outer peripheral side surface, the first end surface 104 and the second end surface 106 of the segment joint body is scraped off, and then heated and dried. After drying, the joining material adhesion prevention film is peeled off. In this way, a segmented joint body in which the side surfaces of adjacent segments are joined by the joining material is manufactured.

The material of the joining material adhesion prevention film is not particularly limited, but for example, synthetic resins such as polypropylene (PP), polyethylene terephthalate (PET), polyimide, and Teflon (registered trademark) can be preferably used. Further, the film preferably has an adhesive layer, and the material of the adhesive layer is preferably an acrylic resin, a rubber resin (for example, rubber containing natural rubber or synthetic rubber as a main component), or a silicone resin.

As the joining material, for example, a material (cement) prepared by mixing a ceramic powder, a dispersion medium (for example, water or the like), and, if necessary, additives such as a binder, a deflocculant, and a foamed resin can be used. As the ceramics, mention can be made to cordierite, mullite, zirconium phosphate, aluminum titanate, silicon carbide, silicon-silicon carbide composite (example: Si-bonded SiC), cordierite-silicon carbide composite, zirconia, spinel, indialite, sapphirine, corundum, titania, silicon nitride and the like, and it is more preferable that the ceramics be the same material as the pillar-shaped honeycomb structure segment.

Further, the segment joint body may be finished into a desired shape (for example, a cylindrical shape) by grinding the outer peripheral side surface, if desired. In this case, it is preferable to apply a coating material to the outer peripheral side surface of the segment joint body after grinding, and then dry and heat-treat to form the outer peripheral side wall 102.

The coating material is not particularly limited, and a known outer peripheral coating material can be used. As the outer peripheral coating material, for example, mention can be made to those in which inorganic raw materials such as inorganic fiber, colloidal silica, clay, and ceramic particle are kneaded with water and additives such as an organic binder, a foamed resin, and a dispersant to form a slurry. Further, the method for applying the outer peripheral coating material is not particularly limited, and a known method can be used.

2. Method for Manufacturing Porous Honeycomb Structure

The porous honeycomb structure according to one embodiment of the present invention can be manufactured by, for example, a manufacturing method including the following steps:

(1) a step of obtaining a honeycomb formed body obtained by forming a green body comprising an aggregate, a bonding material, an organic pore-forming material, a binder and a dispersion medium, the honeycomb formed body comprising a plurality of cell channels that passes through an interior of the porous honeycomb structure and is partitioned by porous partition walls; and (2) a step of firing the honeycomb formed body.

The green body comprising an aggregate, a bonding material, an organic pore-forming material, a binder and a dispersion medium can be prepared by mixing and kneading a raw material composition containing these components. Known additives such as surfactants and sintering aids may be appropriately added to the raw material composition. The mixing and kneading method of the raw material composition is not particularly limited, and can be carried out by a method known in the art. For example, the mixing and kneading of the raw material composition can be performed using a kneader, a vacuum clay kneader, or the like. A desired honeycomb formed body, typically a pillar-shaped honeycomb formed body, is prepared by forming the green body. Extrusion molding can be preferably used as a forming method. By using a die having a desired overall shape, cell shape, partition wall thickness, cell density, and the like for extrusion molding, it is possible to construct a honeycomb structure having a plurality of cell channels that passes through the interior of the honeycomb formed body and are partitioned by the partition walls.

Specific examples of the aggregate and the bonding material are as described above. For the reason of ensuring compatibility between increase in the contact area ratio and reduction in the cumulative 50% pore diameter, the content of the aggregate is preferably 75 to 85 parts by mass, more preferably 76 to 84 parts by mass, and even more preferably 77 to 83 parts by mass with respect to a total of 100 parts by mass of the aggregate and the bonding material in the honeycomb formed body.

In addition, for the reason of ensuring compatibility between high contact area ratio, small cumulative 50% pore diameter, and high porosity, the cumulative 50% particle diameter (D50) from the small particle side is preferably in the range of 15 to 24 µm, more preferably in the range of 16 to 23 µm, and even more preferably in the range of 18 to 22 µm in the volume-based cumulative distribution of particle diameters measured by the laser diffraction/scattering method (based on ISO 13320: 2020).

Also, for the reason of reducing the maximum pore diameter, in the aggregate, the proportion of particles having a particle diameter of 30 µm or more is preferably 20% by volume or less, more preferably 15% by volume or less, and even more preferably 10% by volume or less in the volume-based cumulative distribution of particle diameters measured by the laser diffraction/scattering method (based on ISO 13320: 2020). The lower limit of the proportion of particles having a particle diameter of 30 μm or more is not particularly limited for the aggregate, and it may be 0% by volume.

In addition, for the reason of ensuring the formability of the honeycomb structure and facilitating melting during firing, in the binder the cumulative 50% particle diameter (D50) from the small particle side is preferably in the range of 1 to 9 μm, more preferably in the range of 2 to 8 μm, and even more preferably in the range of 3 to 7 μm in the volume-based cumulative distribution of particle diameters measured by the laser diffraction/scattering method (based on ISO 13320: 2020).

The organic pore-forming material is not particularly limited, and materials known in the art can be used. Examples of the organic pore-forming material include graphite, wheat flour, starch, phenol resin, polymethyl methacrylate, polyethylene, polyethylene terephthalate and the like. These may be used alone or in combination of two or more.

For the reason of ensuring the porosity, the organic pore-forming material is preferably contained in an amount of 5 to 13 parts by mass, preferably 6 to 12 parts by mass, and even more preferably 7 to 11 parts by mass with respect to 100 parts by mass of the aggregate and the bonding material in the honeycomb formed body.

In addition, for the reason of reducing the pore diameter, in the organic pore-forming material, the cumulative 50% particle diameter (D50) from the small particle side is preferably in the range of 4 to 12 μm, more preferably in the range of 5 to 11 μm, and even more preferably in the range of 6 to 10 μm in the volume-based cumulative distribution of particle diameters measured by the laser diffraction/scattering method (based on ISO 13320: 2020). In addition, for the reason of reducing the maximum pore diameter, in the organic pore-forming material, the proportion of particles having a particle diameter of 20 μm or more is preferably 5% by volume or less, more preferably 3% by volume or less, and even more preferably 2% by volume or less in the volume-based cumulative distribution of particle diameters measured by the laser diffraction/scattering method (based on ISO 13320: 2020). The lower limit of the proportion of particles having a particle diameter of 20 μm or more is not particularly limited for the organic pore-forming material, and it may be 0% by volume.

Examples of the binder include organic binders such as methyl cellulose, hydroxypropoxyl cellulose, hydroxyethyl cellulose, carboxymethyl cellulose, and polyvinyl alcohol. The blending amount of the binder is not particularly limited, but can be generally 4 to 9 parts by mass, and typically 5 to 8 parts by mass with respect to a total of 100 parts by mass of the aggregate and the bonding material. As the binder, one type may be used alone, or two or more types may be used in combination.

Examples of the dispersion medium include water or a mixed solvent of water and an organic solvent such as alcohol, and water can be particularly preferably used. The blending amount of the dispersion medium is not particularly limited, but is generally 20 to 50 parts by mass, and typically 25 to 45 parts by mass with respect to a total of 100 parts by mass of the aggregate and the bonding material.

The honeycomb formed body may be dried before firing. The drying method is not particularly limited, and hot gas drying, microwave drying, dielectric drying, reduced-pressure drying, vacuum drying, freeze drying and the like can be used. Among these, it is preferable to perform dielectric drying, microwave drying or hot gas drying alone or in combination. The drying conditions are not particularly limited, but the drying should be carried out preferably at a drying temperature of 30 to 150° C. with a drying time of 1 minute to 2 hours. In the present specification, the term "drying temperature" means the temperature of the atmosphere in which drying is performed.

In the case of manufacturing a porous honeycomb structure provided with plugged portions, the openings of predetermined cells of the honeycomb formed body or the dried body obtained by drying the formed body are plugged with a plugging material. As a method of plugging the openings of the cells, a method of filling the openings of the cells with a plugging material can be used. As a method of filling a plugging material, a conventionally known method of manufacturing a honeycomb structure provided with plugged portions can be performed. As the plugged portion forming raw material for forming the plugged portions, a raw material for forming the plugged portions used in a conventionally known method for manufacturing a honeycomb structure can be used.

Further, the honeycomb formed body may be calcined before firing in order to remove the binder (degreasing). The calcining is preferably performed at a temperature lower than the temperature at which the bonding material such as metallic silicon melts. Specifically, it may be temporarily held at a predetermined temperature of about 150 to 700° C., or may be temporarily calcined by slowing down the temperature rise rate to 50° C./hour or less in a predetermined temperature range.

As for the method of temporarily holding at a predetermined temperature during calcination, depending on the type and amount of the binder used, it may be held at only one temperature level or at a plurality of temperature levels, and further when held at a plurality of temperature levels, the holding time may be the same with or different from each other. Similarly, regarding the method of slowing down the temperature rise rate, it may be slowed down only between a certain temperature range or in a plurality of temperature ranges, and further, in the case of a plurality of ranges, the rate may be the same with or different from each other.

The atmosphere of the calcining may be an oxidizing atmosphere, but if the formed body contains a large amount of binder, the binder may be violently burned by oxygen during the calcining and the temperature of the formed body may rise sharply. Therefore, by performing the calcining in an inert atmosphere such as $N_2$ or Ar, the abnormal temperature rise of the formed body may be suppressed. Such suppression of abnormal temperature rise is an important control when a raw material having a large coefficient of thermal expansion (weak to thermal shock) is used. For example, when the binder is blended in an amount of 20% by mass or more based on the total amount of the aggregate and the bonding material, it is preferable to perform the calcining in an inert atmosphere. Further, in addition to the case where the aggregate is silicon carbide, when there is a concern about oxidation at a high temperature, it is preferable to suppress the oxidation of the formed body by performing the calcining in the above-mentioned inert atmosphere at least above the temperature at which the oxidation starts.

The calcining and the subsequent firing may be performed as separate steps in the same or separate furnaces, or may be performed as continuous steps in the same furnace. When the calcining and the firing are performed in different atmospheres, the former method is preferable, but the latter method is preferable from the viewpoint of total firing time and operating cost of the furnace.

The firing atmosphere may be determined according to the types of aggregate. For example, when an aggregate that is likely to be oxidized at a high temperature is used, it is preferable to use a non-oxidizing atmosphere such as $N_2$ or Ar at least in a temperature range above the temperature at which the oxidation starts. The firing step of the honeycomb formed body can be carried out, for example, by firing at a temperature equal to or higher than the melting point of the bonding material but equal to or lower than 50° C.+the melting point of the bonding material for 1 to 4 hours.

When the porous honeycomb structure is used as a catalyst carrier, the catalyst can be carried on the porous partition walls. The method itself for carrying the catalyst on the porous partition walls is not particularly limited, and a known method may be adopted. For example, a method may be mentioned in which the porous partition walls are contacted with a catalyst composition slurry, followed by drying and firing.

It is desirable that the catalyst composition slurry contains an appropriate catalyst depending on its use. Examples of the catalyst include, but not limited to, oxidation catalysts, reduction catalysts and three-way catalysts for removing pollutants such as soot, nitrogen oxides (NOx), soluble organic fractions (SOF), hydrocarbons (HC) and carbon monoxide (CO). In particular, when the porous honeycomb structure according to the present invention is used as a filter such as DPF or GPF, the particulates (PM) such as soot and SOF in the exhaust gas is collected by the filter, so it is preferable to carry a catalyst that assists the combustion of the particulates. The catalyst may appropriately contain, for example, a noble metal (Pt, Pd, Rh, and the like), an alkali metal (Li, Na, K, Cs, and the like), an alkaline earth metal (Ca, Ba, Sr, and the like), a rare earth (Ce, Sm, Gd, Nd, Y, Zr, Ca, La, Pr, and the like), transition metals (Mn, Fe, Co, Ni, Cu, Zn, Sc, Ti, V, Cr, and the like) and the like.

EXAMPLES

Hereinafter, the present invention will be described in more detail with reference to Examples, but the present invention is not limited to these Examples.

Examples 1 to 6, Comparative Examples 1 to 8

(1. Preparation of Porous Honeycomb Structure)

Aggregates (silicon carbide powder) having various particle diameter distributions were prepared according to the test numbers shown in Table 1. For these aggregates, the cumulative 50% particle diameter (D50) from the small particle side in the volume-based cumulative distribution of particle diameters measured by the laser diffraction/scattering method (based on ISO 13320: 2020), and the proportion of particles having a particle diameter of 30 μm or more in the volume-based cumulative distribution of particle diameters measured by the laser diffraction/scattering method (based on ISO 13320: 2020) were measured using a particle diameter distribution measuring device (HORIBA: LA-960). For the measurement, according to the manual of the device, the sample (10 mg to 5 g) was loaded in an aqueous solvent (about 180 mL) and the ultrasonic dispersion operation time, ultrasonic intensity, and circulation pump speed were adjusted such that the transmittance when irradiated with a laser beam having a wavelength of 650 nm at an output of about 5 mW was 80 to 95%. The results are shown in Table 1.

In addition, metallic silicon powder was prepared as the bonding material. For the bonding material, the cumulative 50% particle diameter (D50) measured by the laser diffraction/scattering method (based on ISO 13320: 2020) from the small particle side using the particle diameter distribution measuring device (HORIBA: LA-960), was 5 μm. For the measurement, the ultrasonic dispersion operation time, ultrasonic intensity, and circulation pump speed were adjusted such that the transmittance under the above-mentioned light irradiation conditions was 80 to 95%. Bonding material with the same particle diameter distribution was used for all test numbers.

In addition, organic pore-forming materials (starch) having various particle diameter distributions were prepared according to the test numbers shown in Table 1. For these organic pore-forming materials, the cumulative 50% particle diameter (D50) from the small particle side in the volume-based cumulative distribution of particle diameters measured by the laser diffraction/scattering method (based on ISO 13320: 2020), and the proportion of particles having a particle diameter of 20 μm or more in the volume-based cumulative distribution of particle diameters measured by the laser diffraction/scattering method (based on ISO 13320: 2020) were measured using the particle diameter distribution measuring device (HORIBA: LA-960). For the measurement, the ultrasonic dispersion operation time, ultrasonic intensity, and circulation pump speed were adjusted such that the transmittance under the above-mentioned light irradiation conditions was 80 to 95%. The results are shown in Table 1.

With respect to a total of 100 parts by mass of the silicon carbide powder (aggregate) and the metal silicon powder (bonding material) prepared above, the organic pore-forming material by mass shown in Table 1, 7 parts by mass of methylcellulose (binder) and 34 by mass of water were added, and they were kneaded with a kneader, and then kneaded with a vacuum clay kneader to obtain a green body. At this time, the mass ratio of the silicon carbide powder (aggregate) to the metallic silicon powder (bonding material) were changed according to the test numbers as shown in Table 1. The obtained green body was formed to a quadrangular pillar-shaped honeycomb formed body with an extrusion molding machine. Next, the obtained formed body was subject to microwave-drying, and then hot gas drying at 120° C., and both end surfaces were cut so as to have a predetermined size to obtain a honeycomb dried body. Next, with respect to the obtained honeycomb dried body, plugged portions were formed at one end for predetermined cells and the other end for the rest of the cells. The predetermined cells and the rest of the cells were arranged alternately so that a checkered pattern was formed on both end surfaces by the cell openings and the plugged portions. As the plugging material, the same material as that of the honeycomb formed body was used. Next, the obtained honeycomb dried body was degreased in the air at 450° C. for 5 hours and then fired in an Ar atmosphere at 1430° C. for 2 hours to obtain a porous honeycomb structure. The required number of porous honeycomb structures related to each test number were prepared for the following characteristic evaluation.

The specifications of the obtained porous honeycomb structure were as follows.
  Overall shape: Quadrangular pillar-shape (rectangular parallelepiped) with a length of 36 mm, a width of about 36 mm, and a height of about 152 mm.
  Cell shape in a cross-section perpendicular to the cell flow path direction: Square Cell density (number of cells per unit cross-sectional area): 46 cells/cm² Partition wall thickness: 178 μm (nominal value based on the die specifications)

surface, and the maximum pore diameter was measured according to the above-mentioned procedure. The results are shown in Table 2. The maximum pore diameter was defined

TABLE 1

| Test number | Aggregate/ bonding matetrial (Mass ratio) | Aggregate particle diameter (D50) [μm] | Percentage of aggregate particles with particle diameter of 30 μm or more [volume %] | Amount of pore-forming material added [Mass parts] | Pore-forming material particle diameter (D50) [μm] | Percentage of pore-forming material with particle diameter of 20 μm or more [volume %] |
|---|---|---|---|---|---|---|
| Example 1 | 80/20 | 21.6 | 9.0 | 8 | 6 | 2 |
| Example 2 | 82/18 | 17.7 | 1.0 | 11 | 6 | 2 |
| Example 3 | 82/18 | 16.0 | 0.8 | 9.5 | 4 | 1 |
| Example 4 | 80/20 | 24.0 | 20.0 | 7 | 12 | 5 |
| Example 5 | 80/20 | 22.0 | 15.0 | 10 | 4 | 1 |
| Example 6 | 80/20 | 22.0 | 15.0 | 9 | 10 | 3 |
| Comparative Example 1 | 80/20 | 25.0 | 22.0 | 4.5 | 16 | 20 |
| Comparative Example 2 | 80/20 | 28.0 | 35.0 | 2.5 | 16 | 20 |
| Comparative Example 3 | 80/20 | 25.5 | 25.0 | 3 | 16 | 20 |
| Comparative Example 4 | 75/25 | 25.0 | 22.0 | 4 | 16 | 20 |
| Comparative Example 5 | 82/18 | 17.7 | 1.0 | 17 | 6 | 2 |
| Comparative Example 6 | 80/20 | 28.0 | 35.0 | 2.5 | 20 | 25 |
| Comparative Example 7 | 80/20 | 23.0 | 20.0 | 2 | 16 | 20 |
| Comparative Example 8 | 80/20 | 25.0 | 22.0 | 1.5 | 16 | 20 |

(2. Ratio of Contact Area)

From the porous honeycomb structure according to each test number obtained by the above manufacturing method, test pieces of the porous partition wall were cut out according to the above-mentioned procedure, and a scanning electron microscope (SEM) (Hitachi High-Tech model TM3030Plus) was used to observe the cut surface, and the ratio of the contact area between the aggregate and the bonding material to the surface area of the bonding material was measured. The ratio of the contact area for the entire porous partition walls was defined as the average measured value of the test pieces of the porous partition wall sampled from five locations of the porous honeycomb structure without bias. The results are shown in Table 2.

(3. Cumulative 50% Pore Diameter (D50))

Regarding the porous partition walls of the porous honeycomb structure according to each test number obtained by the above manufacturing method, using a mercury porosimeter (Autopore IV9500 manufactured by Micromeritics Co., Ltd.), the cumulative 50% pore diameter (D50) from the large pore side in the volume-based cumulative distribution of pore diameters was measured by the mercury injection method specified in JIS R1655: 2003. The measurement using the mercury porosimeter was performed by collecting samples (length×width×height=about 10 mm×about 10 mm×about 15 mm rectangular parallelepiped) from two locations, one near the central portion and one near the outer periphery at the center of the porous honeycomb structure in the height direction, and the average value was used as the measured value. The results are shown in Table 2.

(4. Maximum Pore Diameter)

Regarding the porous partition walls of the porous honeycomb structure according to each test number obtained by the above manufacturing method, test pieces were cut out, and a scanning electron microscope (SEM) (Hitachi High-Tech model TM3030Plus) was used to observe the cut as the average value when the test pieces of the porous partition wall were collected from five locations of the porous honeycomb structure without bias and measured.

(5. Porosity)

Regarding the porous partition walls of the porous honeycomb structure according to each test number obtained by the above manufacturing method, the porosity was measured by the mercury intrusion method specified in JIS R1655: 2003 using a mercury porosimeter (Autopore IV9500 manufactured by Micromeritics Co., Ltd.). As the measurement conditions, the porosity was calculated by the following formula using the total pore volume (mL/g) and the true density of the honeycomb structure (g/mL): Porosity=total pore volume/(total pore volume+1/true density of honeycomb structure)×100(%). The true density of the honeycomb structure was determined from the mass ratio of the aggregate and the bonding material and the true density of each. The measurement using the mercury porosimeter was performed by collecting samples (length×width×height=about 10 mm×about 10 mm×about 15 mm rectangular parallelepiped) from two locations, one near the central portion and one near the outer periphery at the center of the porous honeycomb structure in the height direction, and the average value was used as the measured value. The results are shown in Table 2.

(6. Volume Ratio of Pores with Pore Diameter of 7 to 9 μm)

Regarding the porous partition walls of the porous honeycomb structure according to each test number obtained by the above manufacturing method, using a mercury porosimeter (Autopore IV9500 manufactured by Micromeritics Co., Ltd.), by the mercury intrusion method specified in JIS R1655: 2003, the volume ratio of pores having a pore diameter of 7 to 9 μm with respect to the total pore volume in the volume-based frequency distribution of pore diameters was measured. The measurement using the mercury porosimeter was performed by collecting samples (length× width×height=about 10 mm×about 10 mm×about 15 mm rectangular parallelepiped) from two locations, one near the central portion and one near the outer periphery at the center of the porous honeycomb structure in the height direction, and the average value was used as the measured value. The results are shown in Table 2.

TABLE 2

| Test number | Percentage of contact area [%] | Pore diameter (D50) [μm] | Maximum pore diameter [μm] | Porosity [%] | Volume ratio of pore diameter of 7 to 9 μm [%] |
|---|---|---|---|---|---|
| Example 1 | 70 | 7.6 | 34 | 43.9 | 52 |
| Example 2 | 65 | 6.9 | 25 | 47.2 | 60 |
| Example 3 | 62 | 6.3 | 20 | 45.8 | 45 |
| Example 4 | 79 | 9.8 | 39 | 42.2 | 30 |
| Example 5 | 71 | 8.1 | 30 | 43.9 | 45 |
| Example 6 | 68 | 9.3 | 38 | 44.4 | 40 |
| Comparative Example 1 | 50 | 8.7 | 42 | 44.3 | 37 |
| Comparative Example 2 | 35 | 10.5 | 50 | 41.0 | 17 |
| Comparative Example 3 | 61 | 9.2 | 44 | 41.3 | 28 |
| Comparative Example 4 | 45 | 11.2 | 55 | 41.2 | 15 |
| Comparative Example 5 | 66 | 7.5 | 28 | 49.7 | 54 |
| Comparative Example 6 | 65 | 11.9 | 60 | 40.7 | 10 |
| Comparative Example 7 | 62 | 8.5 | 45 | 41.2 | 65 |
| Comparative Example 8 | 62 | 9.1 | 38 | 39.2 | 32 |

(7. Thermal Conductivity)

Regarding the porous partition walls of the porous honeycomb structure according to each test number obtained by the above manufacturing method, the thermal conductivity at 50° C. was measured using a steady-state thermal conductivity meter (model GH-1S manufactured by ADVANCE RICO Inc.) in accordance with ASTM E1530. The measurement of thermal conductivity was performed by collecting samples (length×width×height=about 36 mm×about 36 mm×about 20 mm rectangular parallelepiped) from three locations at the center of the porous honeycomb structure in the height direction, and the average value was used as the measured value. The results are shown in Table 3.

(8. Soot Collection Performance)

For each test number, 16 porous honeycomb structures obtained by the above manufacturing method were prepared. These were joined together on the side surfaces via a joining material to be integrated, and joined into a 4 vertical×4 horizontal porous honeycomb structures. Next, the porous honeycomb structures were joined with pressure to each other by applying pressure from the outside, and then dried at 140° C. for 2 hours to obtain a joint body. Next, the outer periphery of the joint body was cut such that the cross section of the obtained joint body orthogonal to the direction in which the cells extend was circular. Next, after applying an outer peripheral coating material having the same composition as the joining material to the cut surface, an outer peripheral coating layer was formed by drying at 700° C. for 2 hours, to obtain a pillar-shaped exhaust gas purifying device having a diameter of 144 mm and a height of about 152 mm.

The manufactured exhaust gas purification device was connected to the outlet side of the engine exhaust manifold of a 2.0 L direct injection gasoline engine vehicle, and the number of soot contained in the gas discharged from the outlet of the exhaust gas purification device was measured by a PN measurement method. The "PN measurement method" is a measuring method provided by a particle measurement program (abbreviated as PMP), which was proposed by the Working Party on Pollution and Energy (abbreviated as GRPE) in the World Forum for Harmonization of Vehicle Regulations (abbreviated as WP29) held by the Economic Commission for Europe (abbreviated as ECE) of United Nations (abbreviated as UN). Specifically, in determining the cumulative number of soot, the cumulative number of soot discharged after running in the WLTC (Worldwide harmonized Light duty Test Cycle) mode was used as the number of soot in the exhaust gas purification device to be evaluated. The value of the measured number of soot was evaluated according to the following evaluation criteria. Evaluations A to C were qualified as acceptable. The results are shown in Table 3.

Evaluation A: the number of soot is less than $4.0 \times 10^{10}$.

Evaluation B: the number of soot is $4.0 \times 10^{10}$ or more and less than $5.0 \times 10^{10}$.

Evaluation C: the number of soot is $5.0 \times 10^{10}$ or more and less than $6.0 \times 10^{10}$.

Evaluation D: the number of soot is $6.0 \times 10^{10}$ or more.

(9. Pressure Loss)

First, the soot generated by a soot generator was deposited at 3 g/L on the exhaust gas purification device according to each test number prepared by the same procedure as above. After that, 2.3 mm³/min of air was flowed through the exhaust gas purification device in which soot was deposited, and the pressure difference (pressure loss) at that time was measured, which was defined as a pressure loss with soot. The measured pressure loss value was evaluated according to the following evaluation criteria. Evaluations A to C are qualified as acceptable. The results are shown in Table 3.

Evaluation A: the pressure loss is less than 5.0 kPa.

Evaluation B: the pressure loss is less than 5.5 kPa and 5.0 kPa or more.

Evaluation C: the pressure loss is less than 6.0 kPa and 5.5 kPa or more.

Evaluation D: the pressure loss is 6.0 kPa or more.

(10. Robust)

A temperature difference was created between the central portion and the outer peripheral portion by flowing air heated by a burner through the exhaust gas purification device according to each test number prepared by the same procedure as above, and the crack critical temperature (the maximum temperature at which cracks do not occur on both end surfaces of the honeycomb structure) was determined by a rapid heating test (burner spalling test) for evaluating the thermal shock resistance of the porous honeycomb structure that constitutes the exhaust gas purification device. The test temperature (temperature of the heated air) was 900° C., 1000° C., and 1100° C. in this order. Then, the state of occurrence of cracks in the honeycomb structure after the test was observed. As the evaluation criteria, the case where cracks did not occur even at the test temperature of 1100° C. was regarded as double circle (⊚), the case where cracks did not occur at the test temperature of 1000° C. but occurred at the test temperature of 1100° C. was evaluated as circle (○), the case where cracks did not occur at the test temperature of 900° C. but occurred at the test temperature of 1000° C. was evaluated as triangle (Δ), and the case where cracks occurred at the test temperature of 900° C. was evaluated as cross (x). Further, if the crack critical temperature is 900° C. or higher (evaluation results are triangle, circle, and double circle), there is no problem in practical use, and the product is qualified as acceptable. The results are shown in Table 3.

TABLE 3

| Test number | Thermal conductivity [W/mK] | Soot collection | Pressure loss | Robust |
|---|---|---|---|---|
| Example 1 | 18.5 | B | B | ⊚ |
| Example 2 | 12.2 | A | B | Δ |
| Example 3 | 12.0 | A | A | Δ |
| Example 4 | 20.3 | C | C | ⊚ |
| Example 5 | 18.2 | B | B | ⊚ |
| Example 6 | 17.9 | C | B | ⊚ |
| Comparative Example 1 | 16.5 | D | A | ○ |
| Comparative Example 2 | 23.5 | D | C | ⊚ |
| Comparative Example 3 | 20.3 | D | D | ⊚ |
| Comparative Example 4 | 25.0 | D | C | ⊚ |
| Comparative Example 5 | 10.3 | B | B | X |
| Comparative Example 6 | 23.1 | D | D | ⊚ |
| Comparative Example 7 | 20.9 | C | D | ⊚ |
| Comparative Example 8 | 27.5 | C | D | ⊚ |

(11. Discussion)

As can be seen from the results in Table 3, Examples 1 to 6 showed low pressure loss when the gas containing PM flowed (A evaluation, B evaluation or C evaluation), high strength (triangle, circle, or double circle) and high collection efficiency (A evaluation, B evaluation or C evaluation) were realized. Furthermore, they also had a practical thermal conductivity. On the other hand, Comparative Examples 1 to 8 were qualified as unacceptable in terms of either soot collection, pressure loss, and robust, and were inferior in practicality to Examples 1 to 6.

DESCRIPTION OF REFERENCE NUMERALS

100: Porous honeycomb structure
102: Outer peripheral side wall
103: Side surface
104: First end surface
106: Second end surface
108a: First cell
108b: Second cell
109: Plugged portion
112: Porous partition wall
117: Joining material

The invention claimed is:

1. A porous honeycomb structure, comprising a plurality of cell channels that passes through an interior of the porous honeycomb structure and is partitioned by porous partition walls, wherein the porous partition walls comprise skeleton portions comprising an aggregate and a bonding material, and pore portions formed among the skeleton portions and through which a fluid can flow; and the porous partition walls have a porosity of 40 to 48% as measured by a mercury intrusion method, and a cumulative 50% pore diameter (D50) from a large pore side of 6 to 10 μm in a volume-based cumulative distribution of pore diameters measured by the mercury intrusion method, and a maximum pore diameter observed with a scanning electron microscope of 40 μm or less, and a ratio of a contact area between the aggregate and the bonding material to a surface area of the bonding material observed with the scanning electron microscope of 61 to 80%.

2. The porous honeycomb structure according to claim 1, wherein the porous partition walls have a volume ratio of pores having a pore diameter of 7 to 9 μm with respect to a total pore volume of 40 to 60% in a volume-based frequency distribution of pore diameters measured by the mercury intrusion method.

3. The porous honeycomb structure according to claim 1, wherein a thermal conductivity at 50° C. measured by a steady-state thermal conductivity meter in accordance with ASTM E1530 is 11 W/(m·K) or more.

4. A method for manufacturing the porous honeycomb structure according to claim 1, comprising:

a step of obtaining a honeycomb formed body obtained by forming a green body comprising an aggregate, a bonding material, an organic pore-forming material, a binder and a dispersion medium, the honeycomb formed body comprising a plurality of cell channels that passes through an interior of the porous honeycomb structure and is partitioned by porous partition walls; and a step of firing the honeycomb formed body;

wherein the organic pore-forming material is comprised in the honeycomb formed body in an amount of 5 to 13 parts by mass with respect to a total of 100 parts by mass of the aggregate and the bonding material, and the organic pore-forming material has a cumulative 50% particle diameter (D50) from a small particle side in a range of 4 to 12 μm, and a proportion of particles having a particle diameter of 20 μm or more of 5% by volume or less in a volume-based cumulative distribution of particle diameters measured by a laser diffraction/scattering method; and the aggregate is comprised in the honeycomb formed body in an amount of 75 to 85 parts by mass with respect to the total of 100 parts by mass of the aggregate and the bonding material, and the aggregate has a cumulative 50% particle diameter (D50) from a small particle side in a range of 15 to 24 μm, and a proportion of particles having a particle diameter of 30 μm or more of 20% by volume or less in a volume-based cumulative distribution of particle diameters measured by the laser diffraction/scattering method.

* * * * *